United States Patent [19]
Shiraishi et al.

[11] Patent Number: 5,880,908
[45] Date of Patent: Mar. 9, 1999

[54] GIMBAL ASSEMBLY FOR A MAGNETIC HEAD SLIDER AND A SUSPENSION FOR SUPPORTING AND FIXING THE MAGNETIC HEAD SLIDER

[75] Inventors: Masashi Shiraishi, Saku; Akihiro Takei, Kanagawa; Ichiro Takadera, Tokyo, all of Japan

[73] Assignees: TDK Corporation, Tokyo; NHK Spring Co., Ltd., Yokohama, both of Japan

[21] Appl. No.: 842,565

[22] Filed: Apr. 15, 1997

[30] Foreign Application Priority Data

Apr. 15, 1996 [JP] Japan .................................... 8-115218

[51] Int. Cl.$^6$ .............................. G11B 5/48; G11B 21/21
[52] U.S. Cl. ............................................................ 360/104
[58] Field of Search .............................. 360/97.01, 98.01, 360/103, 104

[56] References Cited

U.S. PATENT DOCUMENTS

| | | | |
|---|---|---|---|
| 5,235,484 | 8/1993 | Maruyama | 360/104 |
| 5,377,064 | 12/1994 | Yaginuma et al. | 360/104 |
| 5,442,504 | 8/1995 | Nagase et al. | 360/104 |
| 5,499,153 | 3/1996 | Uemura et al. | 360/103 |
| 5,530,606 | 6/1996 | Baasch et al. | 360/104 |
| 5,608,590 | 3/1997 | Ziegler et al. | 360/104 |
| 5,617,274 | 4/1997 | Ruiz | 360/104 |
| 5,696,651 | 12/1997 | Endo et al. | 360/104 |
| 5,696,652 | 12/1997 | Satoh | 360/104 |
| 5,699,212 | 12/1997 | Erpelding et al. | 360/104 |
| 5,719,726 | 2/1998 | Hayakawa | 360/104 |

FOREIGN PATENT DOCUMENTS

| | | |
|---|---|---|
| 5-159259 | 6/1993 | Japan . |
| 6-060582 | 3/1994 | Japan . |
| 6-215513 | 8/1994 | Japan . |
| 6-275036 | 9/1994 | Japan . |

OTHER PUBLICATIONS

Patent Abstracts of Japan, vol. 14, No. 569 (P–1144), Dec. 18, 1990 & JP 2–244419 A.
Patent Abstracts of Japan, vol. 95, No. 7, Aug. 31, 1995, & JP 7–093737 A.

*Primary Examiner*—Jefferson Evans
*Attorney, Agent, or Firm*—Nikaido, Marmelstein, Murray & Oram LLP

[57] ABSTRACT

A suspension for supporting a magnetic head slider has a fixing section on which the magnetic head slider is to be fixed with an adhesive. This suspension has a partition pattern for partitioning the fixing section into a plurality of sections for receiving the adhesive.

28 Claims, 3 Drawing Sheets

GIMBAL ASSEMBLY FOR A MAGNETIC HEAD SLIDER AND A SUSPENSION FOR SUPPORTING AND FIXING THE MAGNETIC HEAD SLIDER

FIELD OF THE INVENTION

The present invention relates to a suspension for supporting a magnetic head slider and to a head gimbal assembly (HGA) provided with the suspension and the slider, used in a magnetic disk unit or a magneto-optical disk unit wherein the magnetic head slider opposes a surface of a rotating magnetic or magneto-optical disk with a very low flying height so as to read and write information from and into the disk.

DESCRIPTION OF THE RELATED ART

In the HGA, the suspension supports the magnetic head slider fixed near its one end portion. In general, the fixing of the magnetic head slider to the suspension will be made by means of a bonding resin such as an epoxy adhesive or an ultraviolet curing adhesive supplied between the slider and the suspension. For example, Ohe et al. (Japanese Patent Unexamined Publication No.6-215513) discloses an HGA structure with a magnetic head slider fixed to a suspension by means of a bonding adhesive.

However, such a fixing structure of the conventional HGA may introduce distortion to the magnetic head slider due to shrinkage upon curing of the adhesive. Namely, since the bonding resin has been coated over the whole fixing surface of the slider, some kinds of bonding resin may provide distortions such as crown change (deflected deformation) due to their cure shrinkage to the fixed slider.

Use of a bonding resin or an adhesive with a higher bonding strength will introduce a greater shrinkage to increase crown change. Furthermore, the amount of this crown change will depend upon the environment temperature of the slider and thus it is difficult to achieve CSS (Contact Start Stop) characteristics of the slider. In particular, a specific section of the fixing surface of the slider, to which a load point projection (the reverse of a dimple) of the suspension presses, should be formed in an undistorted shape. If this specific section deforms due to cure shrinkage of the bonding resin, stable constant flying characteristics of the slider can never be expected.

Contrary to this, using of the bonding resin with a lower bonding strength will introduce a smaller shrinkage but insufficient bonding strength will cause the fixed slider easily to separate from the suspension.

According to the above-mentioned fixing structure of the conventional HGA, in addition, it is very difficult to adequately control the amount of the adhesive provided to the fixing section. In fact, the HGA structure disclosed in Ohe et al. has a convex part for preventing overflow of the adhesive at a section on the suspension, on which the magnetic head slider is to be adhered. However, during a bonding process, excess adhesive will overflow the convex part to the outside of the slider-fixing area on the suspension unless the providing amount and also the providing position of the adhesive are precisely controlled.

Furthermore, according to the conventional HGA, since the load point projection presses the fixing surface of the slider through a flexure and the adhesive layer, the distance between the top of the load point projection and the slider's fixing surface will change in accordance with dispersion or variation of the thickness of the adhesive layer. Thus, according to the conventional HGA, it is very difficult to regulate the slider to stay at a stable load point.

SUMMARY OF THE INVENTION

It is therefore an object of the present invention to provide a suspension for supporting a magnetic head slider and a HGA with the suspension and the slider, whereby the magnetic head slider can be fixed to the suspension without deformation and distortion.

Another object of the present invention is to provide a suspension for supporting a magnetic head slider and a HGA with the suspension and the slider, whereby stable constant flying characteristics of the magnetic head slider can be secured.

The present invention relates to a suspension for supporting a magnetic head slider, having a fixing section on which the magnetic head slider is to be fixed by means of adhesive. Particularly, according to the invention, the suspension has a partition pattern for partitioning the fixing section into a plurality of sections for receiving the adhesive.

Since the fixing section of the suspension is partitioned to the sections by means of the partition pattern, the adhesive is separately supplied to each of the sections. Accordingly, crown change of the slider due to cure shrinkage of the adhesive can be effectively suppressed, and also the amount of the crown change due to the environment temperature of the slider can be minimized. Therefore, stable constant flying characteristics of the slider and CSS performance can be expected. In addition, an adhesive with a higher bonding strength can be used without introducing any crown change, resulting in that a strong and reliable bonding can be always expected. Furthermore, since the providing position of the adhesive can be precisely controlled, not only reliable bonding can be always obtained but also the bonding process can be very easily carried out.

It is preferred that the partition pattern partitions the fixing section into the plurality of sections so that the adhesive applied to the respective sections are not mixed with each other. Thus, even if different kinds of adhesive are supplied to the respective sections, these adhesives will not be mixed with each other.

It is also preferred that the suspension further includes a peripheral pattern surrounding the partition pattern, and that each of the sections has at least one opening for flowing out excess adhesive applied to the respective sections into a region between the partition pattern and the peripheral pattern. Thus, the amount of the adhesive in the respective sections can be automatically controlled and also the thickness of the adhesive can be controlled to a constant. Since the excess adhesive never overflow into the outer region of bonding pads which will be electrically connected with respective pads of the magnetic head slider, contamination of these bonding pads due to the adhesive can be effectively prevented.

Preferably, at least one of the sections has a different size from one of the remaining sections. If sizes of the respective sections are adjusted to adequate values depending upon a required bonding strength for the slider and upon the inherent property of the adhesive such as the bonding strength performance, an optimum bonding can be expected.

It is preferred that the suspension further includes a flexure on which the partition pattern is formed, a load beam for supporting the flexure, and a load point projection formed on the load beam for pressing the magnetic head slider through the flexure, and that the partition pattern has a solid layer pattern at a position the load point projection presses. Therefore, the load point projection always presses the fixing surface of the slider through the flexure and the solid layer pattern. As a result, the distance between the top of the load point projection and the fixing surface of the slider will not change in accordance with dispersion or variation of the thickness of the adhesive layer and thus the slider can be surely regulated to stay at a stable load point.

Preferably, the suspension further includes connection conductors to be electrically connected to input/output terminals of the magnetic head slider. The connection conductors may be formed by a plurality of thin film layers, and the partition pattern is formed by at least one layer of the thin film layers. Therefore, the partition pattern can be formed in the same thin film pattern fabrication process as that of the connection conductors and the bonding pads. Thus, no additional fabrication process is necessary for forming the partition pattern.

The present invention also relates to a head gimbal assembly with a magnetic head slider, and a suspension for supporting and fixing the magnetic head slider at a fixing section. The suspension includes a partition pattern for partitioning the fixing section into a plurality of sections for receiving at least one kind of adhesive. The magnetic head slider is fixed to the suspension by means of the adhesive supplied in the sections. As selectively providing different adhesives having different characteristics to the respective sections, reliable and stable bonding which satisfies the required bonding performance can be easily achieved. Also, since the sections are partitioned, it is very easy to confirm whether each kind of the adhesive has already been provided or not. Thus, easier operation and improved reliability for bonding can be expected.

The same kind of adhesive may be supplied to all the sections, or different kinds of adhesive may be supplied to the respective sections.

Further objects and advantages of the present invention will be apparent from the following description of the preferred embodiments of the invention as illustrated in the accompanying drawings.

DESCRIPTION OF THE PREFERRED EMBODIMENTS

Figure 1:
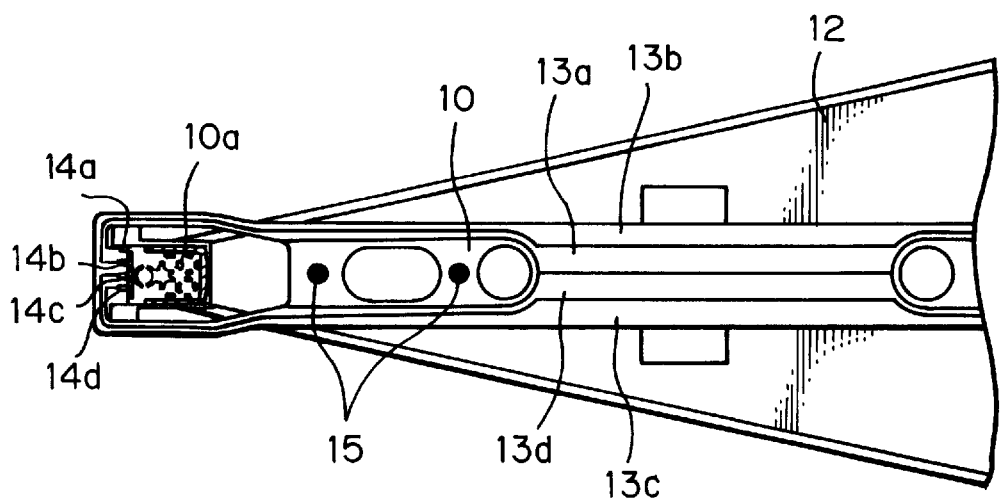
FIG. 1 shows a plane view illustrating a partial structure of a suspension in a preferred embodiment according to the present invention.
Figure 2:
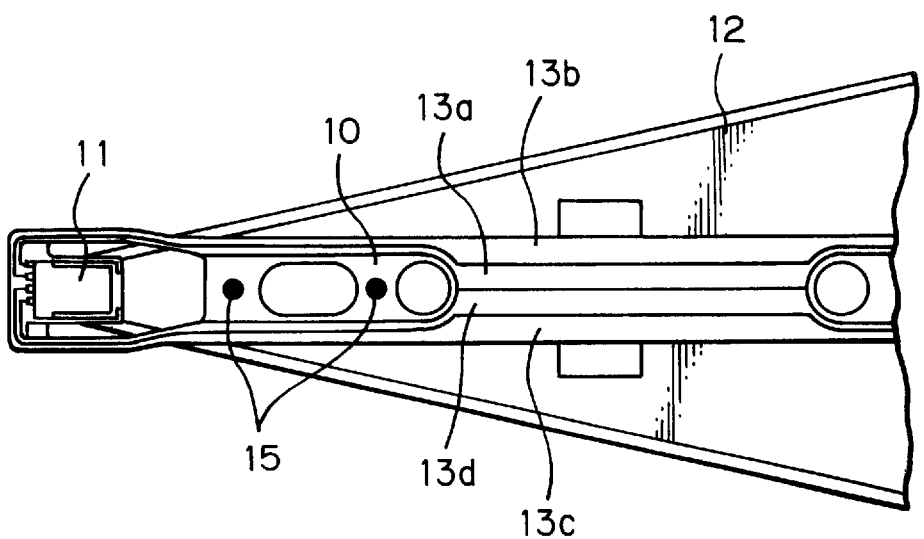
FIG. 2 shows a plane view illustrating a partial structure of a HGA with a magnetic head slider mounted on the suspension shown in FIG. 1.

FIG. 1 illustrates a partial structure of the suspension in a preferred embodiment according to the present invention, and FIG. 2 illustrates a partial structure of the HGA with the magnetic head slider mounted on the suspension shown in FIG. 1.

In these figures, reference numeral 10 denotes a resilient flexure for supporting the magnetic head slider 11 at a tongue or a tab 10a formed near one end portion of the flexure, and 12 denotes a load beam for supporting and fixing the flexure 10, respectively. A base end portion of the load beam 12 is fixed to a base plate (not shown). The magnetic head slider 11 is fixed on the tongue 10a by means of a bonding resin or an adhesive.

The flexure 10 is made, in this embodiment, of a stainless steel plate (for example SUS304TA) with a thickness of about 25 $\mu$m. As for lead lines, four connection conductors 13a–13d of a thin film conductive pattern are formed on the flexure 10. One end of each the connection conductors 13a–13d are electrically connected to four respective bonding pads 14a–14d of a thin film conductive pattern, which pads are directly connected to input/output terminals formed on the magnetic head slider 11 mounted on the top end portion of the flexure 10, and the other respective ends of the connection conductors 13a–13d are connected to external connection pads (not shown) to be connected to external circuits.

The load beam 12 is made, in this embodiment, of a stainless steel plate with a thickness of about 62–76 $\mu$m and supports the flexure 10 along its whole length. Fixing of the flexure 10 to the load beam 12 is achieved by means of a plurality of welded spots 15 such as laser welded spots. A load point projection (not shown in FIGS. 1 and 2) for pressing the fixing surface (surface used for fixing) of the slider 11 through the flexure 10 is formed on the load beam 12.

Figure 3:
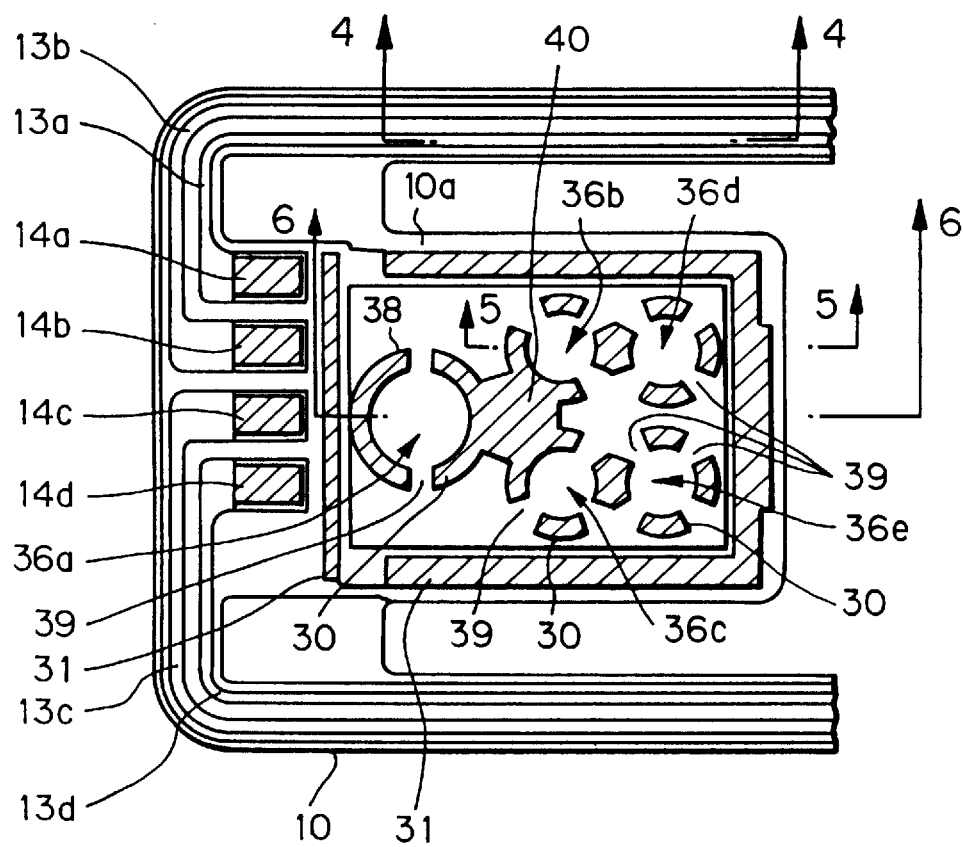
FIG. 3 shows a plane view illustrating in detail a structure of the top portion of a flexure in the embodiment shown in FIG. 1.
Figure 4:
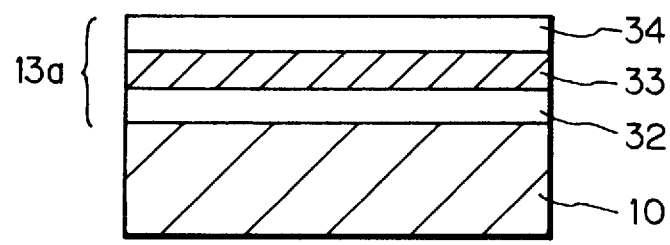
FIG. 4 is a sectional view along a 4—4 line of FIG. 3.
Figure 5:
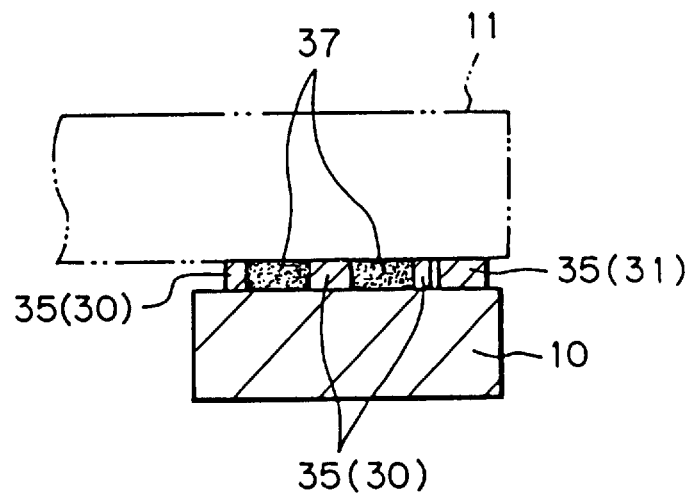
FIG. 5 is a sectional view along a 5—5 line of FIG. 3.
Figure 6:
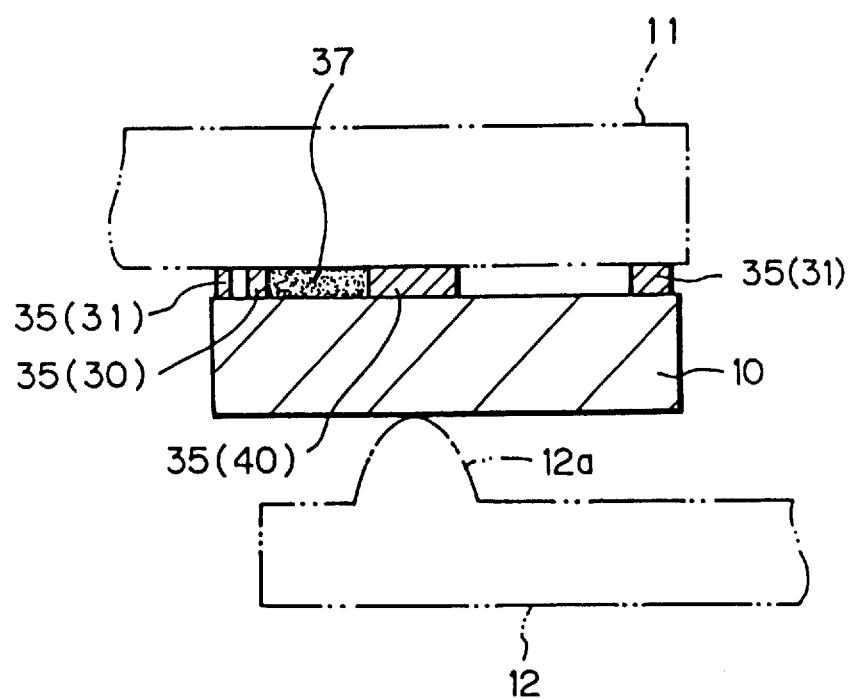
FIG. 6 is a sectional view along a 6—6 line of FIG. 3.

FIG. 3 illustrates in detail a structure of the top portion of the flexure 10, FIG. 4 is a sectional view along line 4—4 of FIG. 3, FIG. 5 is a sectional view along line 5—5 of FIG. 3, and FIG. 6 is a sectional view along line 6—6 of FIG. 3.

As mentioned above the connection conductors 13a—13d and the bonding pads 14a–14d are formed on the flexure 10. Also, as shown in FIG. 3, on the fixing section of the slider 11, positioned at the top portion (on and around the tongue 10a) of the flexure 10, are formed a partition pattern 30 for partitioning the fixing section into a plurality of sections for receiving the adhesive and a peripheral pattern 31 surrounding the partition pattern 30. Partition pattern 30 and peripheral pattern 31 are made as thin film conductive patterns and, in this embodiment, are formed in the same fabrication process as that of the connection conductors 13a–13d and the bonding pads 14a–14d.

These thin film conductive patterns can be formed by a well known method similar to the patterning method of forming a printed circuit board on a thin metal plate.

As shown in FIG. 4, the thin film pattern of the connection conductors 13a–13d is formed by sequentially depositing a polyimide layer 32 with a thickness of about 5 $\mu$m (lower insulating material layer), a patterned Cu layer 33 with a thickness of about 4 $\mu$m (conductors layer), and a polyimide layer 34 with a thickness of about 5 $\mu$m (upper insulating material layer) on the flexure 10 in this order. Although it is not shown, a Ni layer and an Au layer are sequentially deposited on the Cu layer, and there is no upper insulating material layer within the regions of the bonding pads 14a–14d.

As shown in FIGS. 5 and 6, the thin film patterns of the partition pattern 30 and the peripheral pattern 31 are formed by depositing a patterned Cu layer 35 with a thickness of about 4 $\mu$m on the flexure 10. The peripheral pattern 31 is in fact formed by depositing a polyimide layer with a thickness of about 5 $\mu$m (lower insulating material layer) and a patterned Cu layer with a thickness of about 4 $\mu$m on the flexure 10 in this order.

In this embodiment, as shown in FIG. 3, five sections 36a–36e for receiving the adhesive are provided by means of the partition pattern 30. These sections 36a–36e are partitioned so that the adhesive supplied to the respective sections are not mixed with each other. In this embodiment, the section 36a has a larger size than that of another sections 36b–36e. The number, shape and size of the sections described in this embodiment are a mere example and it is apparent that there are various modifications other than that shown in FIG. 3 according to the present invention.

According to the HGA of this embodiment, the fixing section of the suspension, to which the slider 11 is fixed, is partitioned to the sections 36a–36e by means of the partition pattern 30, and the adhesive 37 is separately supplied to each of the sections 36a–36e. Since the adhesive 37 is separately provided to the respective sections, crown change of the slider 11 due to cure shrinkage of the adhesive 37 can be effectively suppressed and also the amount of the crown change due to the environment temperature of the slider can be minimized. Accordingly, stable constant flying characteristics and CSS performance of the slider 11 can be expected. In addition, an adhesive with a higher bonding strength can be used without introducing any crown change resulting that the strong and reliable bonding can be always expected. Furthermore, since providing position of the adhesive can be precisely controlled, not only reliable bonding can be always obtained but also the bonding process can be very easily carried out. Also, since the partition pattern 30 and the peripheral pattern 31 are formed in the same thin film pattern fabrication process as that of the connection conductors 13a–13d and the bonding pads 14a–14d, no additional fabrication process is needed for forming the partition pattern 30 and the peripheral pattern 31.

If sizes of the respective sections 36a–36e are adjusted to adequate values depending upon a required bonding strength for the slider and upon the inherent property of the adhesive such as the bonding strength performance, an optimum bonding can be expected.

In the aforementioned embodiment, the same kind of the adhesive is supplied to the sections 36a–36e. However, in modifications, different kinds of adhesive may be supplied to the respective sections 36a–36e. For example, an adhesive which will introduce little amount of crown change may be provided to the sections 36a–36c, a conductive adhesive such as that containing silver epoxy may be provided to the section 36d and a quick-drying adhesive such as an ultraviolet curing adhesive may be provided to the section 36e. Selectively providing different adhesives with different characteristics to the respective sections as described above results reliable and stable bonding which satisfies the required bonding performance to easily achieve. Since the sections 36a–36e are separated from each other, the different adhesives provided to the respective sections will not be mixed with each other. Also, since the sections 36a–36e are partitioned, it is very easy to confirm whether each kind of the adhesive has already provided or not yet. Thus, easier operation and improved reliability for bonding can be expected.

It is apparent that the above-mentioned assignment of the different kinds of adhesives to the sections is a mere example and that various modifications can be achieved. There are various kinds of adhesives having different characteristics. For example, bonding resins respectively having quick-curing characteristics, characteristics introducing little amount of crown change, high bonding strength characteristics and conductivity are known. By adequately assigning and providing these various kinds of adhesives to the sections, a HGA having a slider fixed to a suspension with substantially no crown change and with the reliable bonding strength can be obtained.

As shown in FIG. 3, an intermediate region 38 with a certain area is formed between the partition pattern 30 and the peripheral pattern 31 and the partition pattern 30 is formed so that each of the sections 36a–36e has at least one opening 39 (two or three openings in this embodiment) for communicating with the intermediate region 38. Divide for the openings 39, excess adhesive applied to the respective sections 36a–36e can flow out to the intermediate region 38 so as to automatically control the amount of the adhesive 37 in the respective sections 36a–36e and also so as to control the thickness of the adhesive 37 to be constant. Furthermore, since the excess adhesive never overflow into the outer region of the bonding pats 14a–14d which will be electrically connected with respective pads of the magnetic head slider, contamination of these bonding pads 14a–14d due to the adhesive can be effectively prevented.

As shown in FIGS. 3 and 6, a solid layer pattern 40 is formed on the flexure 10, at a position to which the load point projection 12a of the load beam 12 is pressing. Therefore, the load point projection 12a always presses the fixing surface of the slider through the flexure 10 and the solid layer pattern 40. As a result, the distance between the top of the load point projection 12a and the fixing surface of the slider 11 will not change in accordance with dispersion or variation of the thickness of the adhesive layer and thus the slider 11 can be surely regulated to stay at a stable load point.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly comprising a magnetic head slider, and a suspension for supporting and fixing said magnetic head slider at a fixing section, said suspension including a partition pattern for partitioning said fixing section into a plurality of sections for receiving different kinds of adhesive, the magnetic head slider being fixed to said suspension by means of the adhesive supplied in said sections, wherein said kinds of adhesive are different in at least one of curing speed, crown change produced, bonding strength, and conductivity.

2. The head gimbal assembly as claimed in claim 1, wherein the same kind of adhesive is supplied to some of said sections.

3. The head gimbal assembly as claimed in claim 1, wherein said partition pattern partitions said fixing section into the plurality of sections so that the adhesive applied to the respective sections are not mixed with each other.

4. The head gimbal assembly as claimed in claim 1, wherein at least one of said sections has a different size from one of the remaining sections.

5. The head gimbal assembly as claimed in claim 1, wherein said suspension includes a flexure on which said partition pattern is formed, a load beam for supporting said flexure, and a load point projection formed on said load beam for pressing said magnetic head slider through said flexure, and wherein said partition pattern has a solid layer pattern at a position said load point projection presses.

6. A suspension for supporting a magnetic head slider, having a fixing section on which a magnetic head slider is to be fixed by means of adhesive, said suspension comprising:

a partition pattern for partitioning said fixing section into a plurality of sections for receiving the adhesive; and a peripheral pattern surrounding said partition pattern, each of said sections having at least one opening for flowing out excess adhesive applied to the respective sections into a region between said partition pattern and said peripheral pattern.

7. The suspension as claimed in claim 6, wherein said partition pattern partitions said fixing section into the plurality of sections so that the adhesive applied to the respective sections are not mixed with each other.

8. The suspension as claimed in claim 6, wherein at least one of said sections has a different size from one of the remaining sections.

9. The suspension as claimed in claim 6, wherein said suspension further comprises a flexure on which said partition pattern is formed, a load beam for supporting said flexure, and a load point projection formed on said load beam for pressing the magnetic head slider through said flexure, and wherein said partition pattern has a solid layer pattern at a position said load point projection presses.

10. The suspension as claimed in claim 6, wherein said suspension further comprises connection conductors to be electrically connected to input/output terminals of the magnetic head slider, said connection conductors being formed by a plurality of thin film layers, and wherein said partition pattern is formed by at least one layer of said thin film layers.

11. A suspension for supporting a magnetic head slider, having a fixing section on which a magnetic head slider is to be fixed by means of adhesive, said suspension comprising:
   a partition pattern for partitioning said fixing section into a plurality of sections for receiving the adhesive; and
   connection conductors to be electrically connected to input/output terminals of the magnetic head slider, said connection conductors being formed by a plurality of thin film layers, said partition pattern being formed by at least one layer of said thin film layers.

12. The suspension as claimed in claim 11, wherein said partition pattern partitions said fixing section into the plurality of sections so that the adhesive applied to the respective sections are not mixed with each other.

13. The suspension as claimed in claim 11, wherein at least one of said sections has a different size from one of the remaining sections.

14. The suspension as claimed in claim 11, wherein said suspension further comprises a flexure on which said partition pattern is formed, a load beam for supporting said flexure, and a load point projection formed on said load beam for pressing the magnetic head slider through said flexure, and wherein said partition pattern has a solid layer pattern at a position said load point projection presses.

15. A head gimbal assembly comprising a magnetic head slider, and a suspension for supporting and fixing said magnetic head slider at a fixing section, said suspension including:
   a partition pattern for partitioning said fixing section into a plurality of sections for receiving at least one kind of adhesive, said magnetic head slider being fixed to said suspension by means of the adhesive supplied in said sections; and
   a peripheral pattern surrounding said partition pattern, each of said sections having at least one opening for flowing out excess adhesive applied to the respective sections into a region between said partition pattern and said peripheral pattern.

16. The head gimbal assembly as claimed in claim 15, wherein the same kind of adhesive is supplied to said sections.

17. The head gimbal assembly as claimed in claim 15, wherein different kinds of adhesive are supplied to some of said sections, respectively.

18. The head gimbal assembly as claimed in claim 15, wherein said partition pattern partitions said fixing section into the plurality of sections so that the adhesive applied to the respective sections are not mixed with each other.

19. The head gimbal assembly as claimed in claim 15, wherein said suspension includes a peripheral pattern surrounding said partition pattern, and wherein each of said sections has at least one opening for flowing out excess adhesive applied to the respective sections into a region between said partition pattern and said peripheral pattern.

20. The head gimbal assembly as claimed in claim 15, wherein at least one of said sections has a different size from one of the remaining sections.

21. The head gimbal assembly as claimed in claim 15, wherein said suspension includes a flexure on which said partition pattern is formed, a load beam for supporting said flexure, and a load point projection formed on said load beam for pressing said magnetic head slider through said flexure, and wherein said partition pattern has a solid layer pattern at a position said load point projection presses.

22. The head gimbal assembly as claimed in claim 15, wherein said suspension includes connection conductors to be electrically connected to input/output terminals of said magnetic head slider, said connection conductors being formed by a plurality of thin film layers, and wherein said partition pattern is formed by at least one layer of said thin film layers.

23. A head gimbal assembly comprising a magnetic head slider, and a suspension for supporting and fixing said magnetic head slider at a fixing section, said suspension including:
   a partition pattern for partitioning said fixing section into a plurality of sections for receiving at least one kind of adhesive, said magnetic head slider being fixed to said suspension by means of the adhesive supplied in said sections; and
   connection conductors to be electrically connected to input/output terminals of said magnetic head slider, said connection conductors being formed by a plurality of thin film layers, said partition pattern being formed by at least one layer of said thin film layers.

24. The head gimbal assembly as claimed in claim 23, wherein the same kind of adhesive is supplied to some of said sections.

25. The head gimbal assembly as claimed in claim 23, wherein different kinds of adhesive are supplied to said sections, respectively.

26. The head gimbal assembly as claimed in claim 23, wherein said partition pattern partitions said fixing section into the plurality of sections so that the adhesive applied to the respective sections are not mixed with each other.

27. The head gimbal assembly as claimed in claim 23, wherein at least one of said sections has a different size from one of the remaining sections.

28. The head gimbal assembly as claimed in claim 23, wherein said suspension includes a flexure on which said partition pattern is formed, a load beam for supporting said flexure, and a load point projection formed on said load beam for pressing said magnetic head slider through said flexure, and wherein said partition pattern has a solid layer pattern at a position said load point projection presses.

* * * * *